US008808822B2

(12) United States Patent
Osada et al.

(10) Patent No.: US 8,808,822 B2
(45) Date of Patent: Aug. 19, 2014

(54) JOINT STRUCTURE FOR FIBER REINFORCED RESIN AND METAL, AND JOINING METHOD FOR FIBER REINFORCED RESIN AND METAL

(71) Applicant: Fuji Jukogyo Kabushiki Kaisha, Tokyo (JP)

(72) Inventors: Tamotsu Osada, Tokyo (JP); Ayako Oide, Tokyo (JP); Takahiro Nagayama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/769,118

(22) Filed: Feb. 15, 2013

(65) Prior Publication Data

US 2013/0236701 A1 Sep. 12, 2013

(30) Foreign Application Priority Data

Mar. 6, 2012 (JP) ................................. 2012-048693

(51) Int. Cl.
*B32B 3/06* (2006.01)
*B29C 65/00* (2006.01)

(52) U.S. Cl.
CPC ............. *B29C 66/12822* (2013.01); *B32B 3/06* (2013.01)

USPC .............................................. 428/60; 244/131

(58) Field of Classification Search
CPC ............................ B29C 66/12822; B32B 3/06
USPC ........................................ 428/58, 60; 244/131
See application file for complete search history.

(56) References Cited

FOREIGN PATENT DOCUMENTS

| JP | 61-9135 B2 | 3/1986 |
| JP | 63-178126 | 11/1988 |
| JP | 2001-032819 A | 2/2001 |

*Primary Examiner* — Alexander Thomas
(74) *Attorney, Agent, or Firm* — McGinn IP Law Group, PLLC

(57) ABSTRACT

There is provided a joint structure for a fiber reinforced resin and a metal. In the structure, multiple single elements are laminated such that the step-shaped structures are superposed in a thickness direction. Each element is constituted by a metallic material including a step-shaped structure having an end portion that gradually becomes thinner towards an end surface thereof so as to form a step-shaped joint surface, and a fiber reinforced plastic laminated such that an end portion thereof covers the step-shaped structure smoothly. A main welding portion is formed on an outer end of the metallic material by welding mating surfaces of adjacent metallic materials. A secondary welding portion is formed on the plastic side of the main welding portion on all the metallic materials by welding them in the thickness direction.

2 Claims, 8 Drawing Sheets

Thermal curing

JOINT STRUCTURE FOR FIBER REINFORCED RESIN AND METAL, AND JOINING METHOD FOR FIBER REINFORCED RESIN AND METAL

CROSS-REFERENCE TO RELATED APPLICATIONS

The present application claims priority from Japanese Patent Application No. 2012-048693 filed on Mar. 6, 2012, the entire contents of which are hereby incorporated by reference.

BACKGROUND OF THE INVENTION

1. Field of the Invention

The present invention relates to a joint between a fiber reinforced resin and a metal.

2. Description of the Related Art

Fiber reinforced plastics (FRPs) are today used widely in structural members for aircraft, vehicles, ships, and general industrial instruments. For example, a known structural member is formed by impregnating a woven fabric, which is constituted by inorganic reinforcing fibers such as carbon fibers or glass fibers that are disposed in crisscross and interwoven, with a resin such as epoxy resin, and then hardening the resin.

In many cases, however, structural members are not formed entirely from fiber reinforced plastics, and a metallic material must be applied partially thereto.

It is therefore necessary to join the fiber reinforced plastic and the metallic material with a high degree of strength. In techniques proposed in the related art, as described in Japanese Unexamined Utility Model (Registration) Application Publication (JP-UM-A) No. S63-178126 and Japanese Examined Patent Publication (JP-B) No. S61-009135, and Japanese Unexamined Patent Application Publication (JP-A) No. 2001-032819, the fiber reinforced plastic is adhered directly to the metallic material, thereby eliminating the need for a fastening tool, and as a result, a reduction in weight and so on are achieved.

In the case where two members are joined by adhesion, if end surfaces of the two members are mated such that a resulting mating surface serves alone as an adhesion surface, the adhesion surface is small, and therefore a large degree of strength cannot be expected from a resulting joint structure.

A joint structure described in JP-UM-A No. S63-178126 employs a step-shaped joint surface obtained by forming complementary step structures on each of the end portions of two members to be joined. As a result, an adhesion surface having a large surface area is secured on a step surface that is perpendicular to the mating surface.

A joint structure described in JP-B No. S61-009135 employs a multi-step-shaped joint surface in a tube material. Further, JP-B No. S61-009135 describes a structure in which the step-shaped joint surfaces are superposed in two layers (see FIG. 3 of JP-B No. S61-009135). In this structure, an end portion of a metallic material formed in a tapered step shape is inserted into a groove formed in a shallow step shape that opens onto an end surface of a fiber reinforced plastic.

In a joint structure described in JP-A No. 2001-032819, a fiber reinforced plastic and a metallic material are disposed so as to overlap partially and wound together in a shaft material with axial direction ends thereof arranged diagonally. Thus, the two materials are superposed alternately in a plurality of layers on a cross-section passing through an axis thereof.

According to the technique described in JP-A No. 2001-032819, however, although the two materials can be superposed alternately to form a multi-layer structure, it is only possible to form a roll-shaped pipe material, and a planar structure or a structure having a desired curve cannot be formed. Moreover, a step-shaped joint surface, and in particular a multi-step-shaped joint surface, cannot be formed. Furthermore, as the two materials are wound, a region in which the materials are superposed gradually becomes misaligned in the axial direction such that the region increases in length. It is difficult to form another structure simultaneously in a structural portion used as a joint. Therefore, when the joint structure increases in size, a degree of design freedom is restricted correspondingly. As a result, application locations for the joint structure become limited, which is undesirable.

Furthermore, the technique described in JP-UM-A No. S63-178126 relates to a joint structure formed by superposing a single layer of fiber reinforced plastic and a single layer of metallic material. In the technique described in JP-B No. S61-009135, the metallic material is not provided in two or more layers.

Hence, with the conventional techniques described above, it is difficult to obtain a structure that is formed by alternately superposing at least two layers each of a fiber reinforced plastic and a metallic material and has a planar shape or a desired curved shape. Moreover, limitations occur naturally in a layer thickness of the layers relative to an overall required thickness, making it difficult to increase the number of layers.

Therefore, as shown in FIG. 8, for example, the inventors have developed a joint structure 100 for a fiber reinforced resin and a metal which is formed by laminating a plurality of single elements 103, each constituted by a metallic material 101 that includes a step-shaped structure having an end portion that gradually becomes thinner in a direction of an end surface of the end portion so as to form a step-shaped joint surface, and a fiber reinforced plastic 102 laminated such that an end portion thereof covers the step-shaped structure smoothly. With this joint structure, a number of steps of the step-shaped joint surface can be increased. Moreover, a number of fiber reinforced resin layers and metal layers laminated alternately via the step-shaped joint surface can be increased easily while suppressing an overall thickness.

Further, to increase the joint strength, the inventors have investigated a technique of adhering the metallic material 101 and the fiber reinforced plastic 102 by thermally curing each element 103, and then forming a welding portion 104 on each joint surface by welding adjacent metallic materials 101.

In the joint structure 100 shown in FIG. 8, however, resin that flows out of the fiber reinforced plastic 102 when the plurality of laminated elements 103 are thermally cured may infiltrate an entire inter-layer region. As a result, a defect such as porosity may occur when the metallic materials 101 are welded.

SUMMARY OF THE INVENTION

The present invention has been designed in consideration of the circumstances described above, and an object thereof is to prevent the resin that flows out during thermal curing from infiltrating the entire inter-layer region of the metallic materials, thereby achieving an improvement in quality.

To solve the problem described above, an aspect of the present invention provides a joint structure for a fiber reinforced resin and a metal, in which end portions of a fiber reinforced plastic and a metallic material are joined via a step-shaped joint surface. In the joint structure, a plurality of single elements, each constituted by the metallic material, which includes a step-shaped structure having an end portion that gradually becomes thinner in a direction of an end surface of the end portion so as to form the step-shaped joint surface, and the fiber reinforced plastic, which is laminated such that an end portion thereof covers the step-shaped structure smoothly, are laminated such that the step-shaped structures are superposed in a thickness direction. The metallic material and the fiber reinforced plastic are adhered to each other, and adjacent elements are joined to each other by superposed surfaces thereof. A main welding portion is formed on an outer end of the metallic material by welding mating surfaces of adjacent metallic materials. A secondary welding portion is formed on the fiber reinforced plastic side of the main welding portion on all of the metallic materials of the plurality of laminated elements by welding all of the metallic materials in the thickness direction.

Another aspect of the present invention provides a joining method for a fiber reinforced resin and a metal, by which end portions of a fiber reinforced plastic and a metallic material are joined via a step-shaped joint surface. The method includes the following processes:

forming a step-shaped structure in which an end portion of the metallic material gradually becomes thinner in a direction of an end surface of the end portion so as to form the step-shaped joint surface;

laminating the fiber reinforced plastic such that an end portion thereof covers the step-shaped structure smoothly;

laminating a plurality of single elements, each constituted by the metallic material and the fiber reinforced plastic laminated to cover the step-shaped structure, such that the step-shaped structures are superposed in a thickness direction;

forming a secondary welding portion at a predetermined interval from outer ends of the plurality of laminated elements on the metallic material side by welding all of the metallic materials of the plurality of elements in the thickness direction;

thermally curing the fiber reinforced plastic such that the metallic material and the fiber reinforced plastic are adhered and adjacent elements are joined to each other by superposed surfaces thereof; and then forming a main welding portion on the outer ends of adjacent metallic materials by welding mating surfaces of the adjacent metallic materials.

According to the present invention, the secondary welding portion is formed on the fiber reinforced plastic side of the main welding portion on all of the metallic materials of the plurality of laminated elements by welding all of the metallic materials in the thickness direction. By forming the secondary welding portion prior to thermal curing, resin that melts away from the fiber reinforced plastic due to the thermal curing so as to infiltrate the outer end of the metallic material can be blocked by the secondary welding portion. As a result, the resin that flows out during thermal curing can be prevented from infiltrating an entire inter-layer region of the metallic materials, and therefore an improvement in quality can be achieved.

DESCRIPTION OF THE PREFERRED EMBODIMENT

An embodiment of the present invention will be described below with reference to the drawings. Note that the present invention is not limited to the following embodiment.

Figure 1:
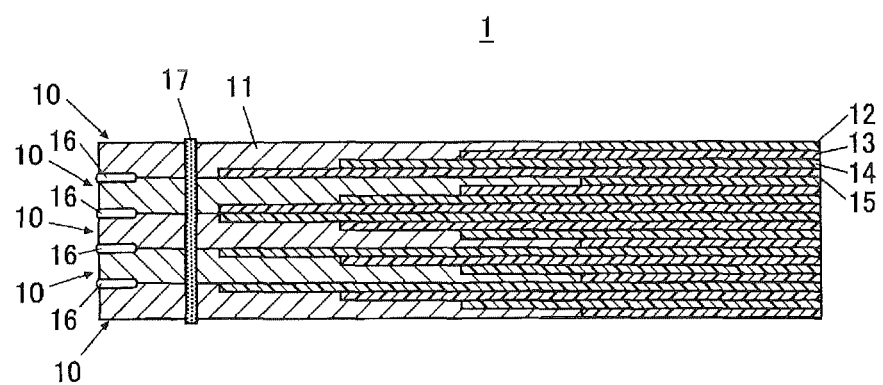
FIG. 1 is a sectional view of a joint structure for a fiber reinforced resin and a metal according to an embodiment of the present invention.
Figure 2:
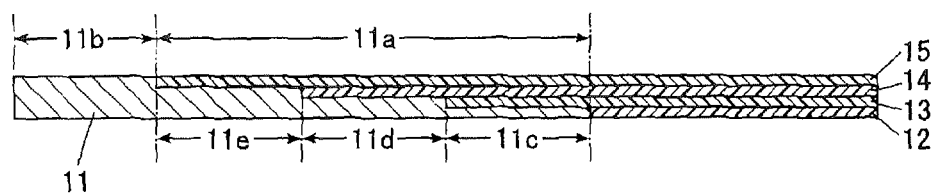
FIG. 2 is a sectional view showing a single element of the joint structure for a fiber reinforced resin and a metal according to this embodiment of the present invention.

As shown in FIG. 1, a joint structure 1 for a fiber reinforced resin and a metal according to this embodiment is formed by laminating a plurality of single elements 10 shown singly in FIG. 2.

The single element 10 is constituted by a metallic material (metal foil) 11 and fiber reinforced plastics 12 to 15. The metallic material 11 and the fiber reinforced plastics 12 to 15 are adhered via a step-shaped joint surface, and the elements 10 are joined by superposed surfaces thereof.

As shown in FIG. 1, a main welding portion 16 is formed on an outer end of the metallic material 11 of the joint structure 1 by welding mating surfaces of adjacent metallic materials 11. Further, a secondary welding portion 17 is formed on the fiber reinforced plastic 12 to 15 side of the main welding portion 16 on all of the metallic materials 11 of the plurality of laminated elements 10 by welding all of the metallic materials 11 in the thickness direction.

Here, a method of joining the fiber reinforced resin and the metal will be described while describing a manufacturing process.

First, as shown in FIG. 2, an end portion 11a of the metallic material 11 is formed with a step-shaped structure that gradually becomes thinner in the direction of an end surface thereof.

Next, the fiber reinforced plastics 12 to 15, which are pre-impregnated by impregnating fibers with a matrix resin, are laminated in sequence onto the step-shaped structure on the end portion 11a of the metallic material 11.

The fiber reinforced plastics 12 to 15 are divided for convenience into parts corresponding to steps of the end portion 11a. The fiber reinforced plastics 12 to 15 are each constituted by one or a plurality of pre-pregs.

In the lamination process, first, the fiber reinforced plastic 12 is mated with the end surface of the end portion 11a. An end of the fiber reinforced plastic 13 is then disposed in a position deviating further toward a thickest portion 11b side of the metallic material 11 than the end of the fiber reinforced plastic 12, whereupon the fiber reinforced plastic 13 is laminated such that a first step surface 11c is covered smoothly by the end portion of the fiber reinforced plastic 13. Similarly, an end of the fiber reinforced plastic 14 is disposed in a position deviating further toward the thickest portion 11b side of the metallic material 11 than the end of the fiber reinforced plastic 13, whereupon the fiber reinforced plastic 14 is laminated such that a second step surface 11*d* is covered smoothly by the end portion of the fiber reinforced plastic 14. Likewise, an end of the fiber reinforced plastic 15 is disposed in a position deviating further toward the thickest portion 11*b* side of the metallic material 11 than the end of the fiber reinforced plastic 14, whereupon the fiber reinforced plastic 13 is laminated such that a third step surface 11*e* is covered smoothly by the end portion of the fiber reinforced plastic 15. Note that the fiber reinforced plastics 12 to 15 may be laminated after applying a paste adhesive or laminating a film adhesive to surfaces of the step-shaped structure of the metallic material 11 that come into contact with the fiber reinforced plastics 12 to 15.

Figure 3:
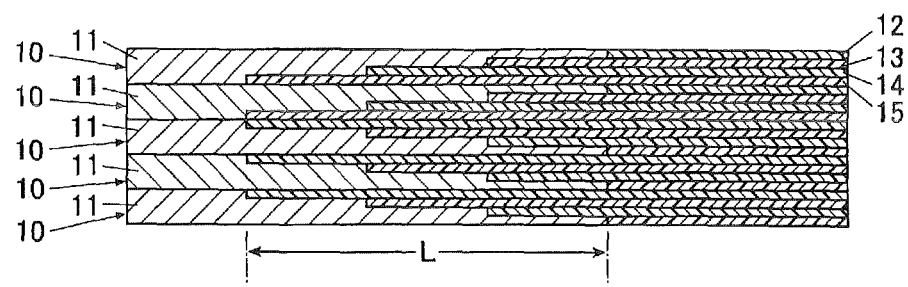
FIG. 3 is a sectional view showing the joint structure for a fiber reinforced resin and a metal according to this embodiment of the present invention in a condition where a plurality of the single elements are laminated.

A plurality of the elements 10 described above is laminated such that the step-shaped structures thereof are superposed in a thickness direction, as shown in FIG. 3. Alternatively, a required number of the elements 10 may be manufactured and then laminated such that the step-shaped structures thereof are superposed in the thickness direction, as shown in FIG. 3.

In FIG. 3, a length of the step-shaped joint surface is indicated by L.

When laminating the elements 10, a front and a back of the elements 10 may be counterchanged where appropriate, but as shown in FIG. 3, the metallic material 11 is preferably disposed to form the overall front and back, or in other words, the two outer surfaces, in the region in which the step-shaped structure is formed. When metal surfaces are disposed as the outer surfaces, greater strength is realized against an external impact.

Further, each of end positions of the step-shaped structures of the elements 10 is preferably disposed in alignment in order to reduce the length L of the step-shaped joint surface.

Figure 4:
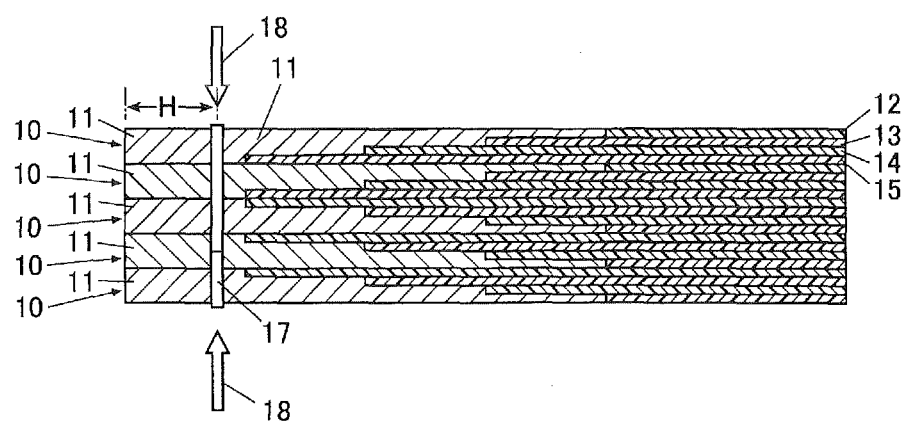
FIG. 4 is a sectional view showing the joint structure for a fiber reinforced resin and a metal according to this embodiment of the present invention when all of the plurality of laminated elements are welded.

Next, as shown in FIG. 4, a secondary welding portion 17 is formed in a position removed by a predetermined interval H from outer ends of the plurality of laminated elements 10 on the metallic material 11 side by welding all of the metallic materials 11 of the plurality of elements 10 in the thickness direction. The secondary welding portion 17 is formed by emitting a welding heat source such as a laser toward the metallic materials 11 in the thickness direction from at least one of a front surface side and back surface side of the metallic materials 11, as shown by an arrow 18, such that all of the metallic materials 11 are welded in the thickness direction. The drawing is a sectional view of the joint structure 1, but the secondary joint portion 17 is preferably formed continuously on a side of the plate materials forming the joint structure 1, or more strictly speaking a side opposing the joint surface between the metal material 11 and the fiber reinforced plastics 12 to 15.

An emission direction of the welding heat source is selected appropriately in accordance with the thickness of the joint structure 1 such that the welding heat source is emitted either from one surface side only or from two surface sides, i.e. the front surface side and the rear surface side.

Figure 5:
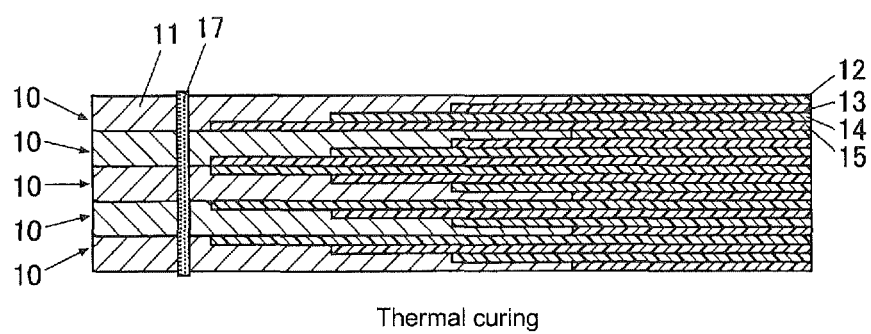
FIG. 5 is a sectional view showing the joint structure for a fiber reinforced resin and a metal according to this embodiment of the present invention when thermal curing is performed following welding.

After forming the secondary welding portion 17, as shown in FIG. 5, the fiber reinforced plastics 12 to 15 of each element 10 are thermally cured with the plurality of elements 10 in a laminated condition.

As a result, the metallic material 11 and the fiber reinforced plastics 12 to 15 are adhered, and all of the fiber reinforced plastics 12 to 15 are integrated. Further, the secondary welding portion 17 prevents resin that flows out of the fiber reinforced plastics 12 to 15 during the thermal curing so as to infiltrate an inter-layer region between the metallic materials 11 from moving to the outer end side.

Figure 6:
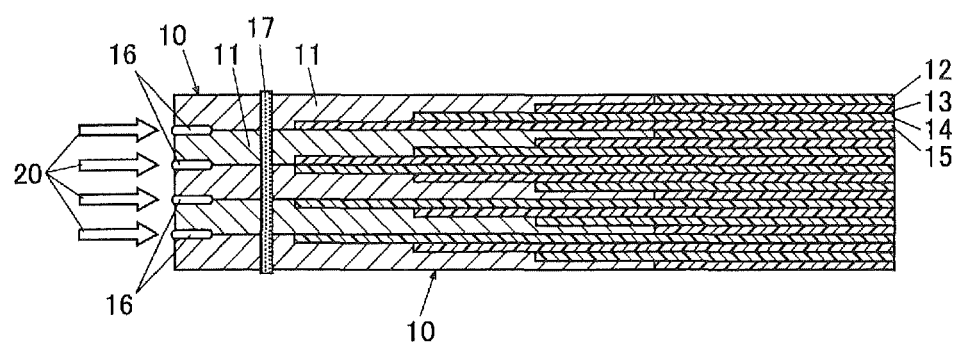
FIG. 6 is a sectional view showing inter-layer welding in the joint structure for a fiber reinforced resin and a metal according to this embodiment of the present invention.

Next, as shown in FIG. 6, a main welding portion 16 is formed by welding mating surfaces of adjacent metallic materials 11 from the outer end side of the metallic materials 11. The main welding portion 16 is formed up to a deep position of each mating surface by emitting a welding heat source such as a laser toward the mating surfaces of the metallic materials 11 parallel to the mating surfaces from an outer end surface, as shown by an arrow 20.

Figure 7:
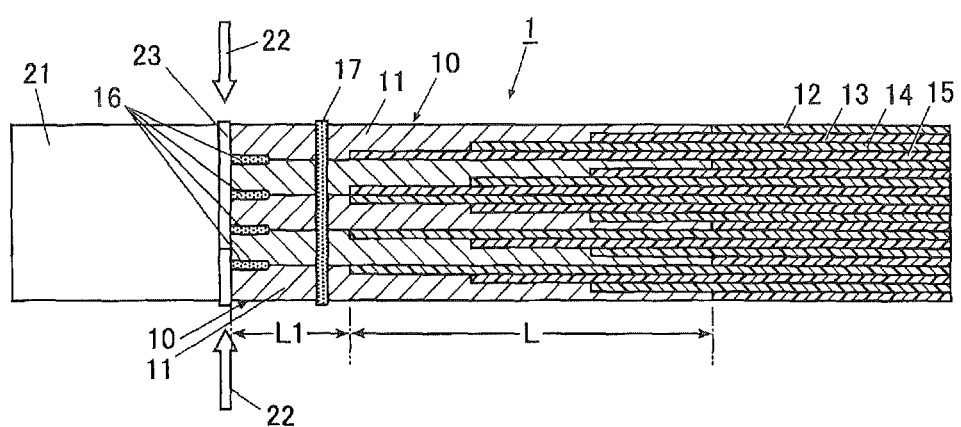
FIG. 7 is a sectional view showing end surface welding in the joint structure for a fiber reinforced resin and a metal according to this embodiment of the present invention.
Figure 8:
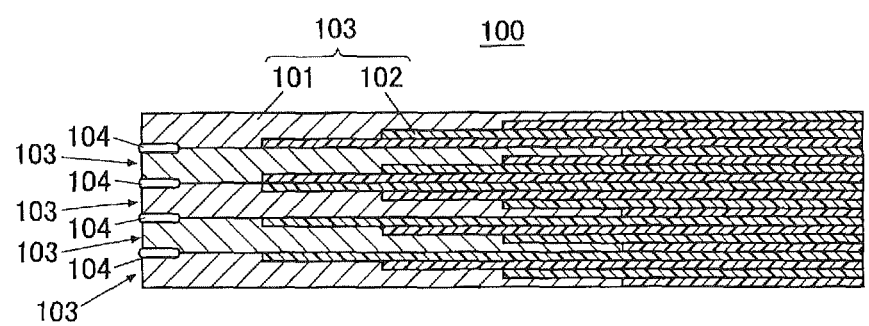
FIG. 8 is a sectional view showing a conventional joint structure for a fiber reinforced resin and a metal.

If necessary, the end surface formed with the main welding portion 16 is shaped by grinding or the like, whereupon an end surface of a metallic component 21 is mated with the shaped end surface and joined thereto by welding, as shown in FIG. 7. Likewise at this time, as shown by arrows 22, a welding heat source such as a laser is emitted parallel to mating surfaces between the metallic material 11 and the metallic component 21 toward the mating surfaces such that a welded portion 23 is formed up to a deep position.

As is evident from the manufacturing process described above, in the joint structure 1 for a fiber reinforced resin and a metal according to this embodiment, in which end portions of a fiber reinforced plastic and a metallic material are joined via a step-shaped joint surface, a plurality of single elements 10, each constituted by the metallic material 11, which includes a step-shaped structure having an end portion that gradually becomes thinner in a direction of an end surface of the end portion so as to form the step-shaped joint surface, and the fiber reinforced plastics 12 to 15, which are laminated such that end portions thereof cover the step-shaped structure smoothly, are laminated such that the step-shaped structures are superposed in a thickness direction. The metallic material 11 and the fiber reinforced plastics 12 to 15 are adhered to each other, and adjacent elements 10 are joined to each other by superposed surfaces thereof. The main welding portion 16 is formed on an outer end of the metallic material 11 by welding mating surfaces of adjacent metallic materials 11. The secondary welding portion 17 is formed on the fiber reinforced plastic 12 to 15 side of the main welding portion 16 on all of the metallic materials 11 of the plurality of laminated elements 10 by welding all of the metallic materials 11 in the thickness direction.

According to this embodiment, as described above, the secondary welding portion 17 is formed on the fiber reinforced plastic 12 to 15 side of the main welding portion 16 on all of the metallic materials 11 of the plurality of laminated elements 10 by welding all of the metallic materials 11 in the thickness direction. Hence, by forming the secondary welding portion 17 prior to the thermal curing, resin that flows out of the fiber reinforced plastics 12 to 15 during the thermal curing so as to infiltrate the outer end of the metallic material 11 can be blocked by the secondary welding portion 17. As a result, the resin that flows out during the thermal curing can be prevented from infiltrating an entire inter-layer region of the metallic materials 11, and therefore an improvement in quality can be achieved.

Further, when the plate materials constituting the plurality of elements 10 are flat plates, positional deviation is unlikely to occur between the element 10 before or during the thermal curing. When the plate materials are curved, however, the possibility of positional deviation before or during the thermal curing increases. By forming the secondary welding portion 17 before the thermal curing, as in this embodiment, the plurality of elements 10 can be temporarily retained by the secondary welding portion 17, and as a result, positional deviation can be prevented.

Moreover, in the embodiment described above, each step-shaped structure is formed with three steps, but this is merely an example. The step-shaped structure is preferably formed with at least two steps. In a joint structure having a step-shaped joint surface, stress is concentrated in the end portion of each step. Therefore, by forming the step-shaped structure with a larger number of steps, stress concentration can be dispersed, leading to a reduction in maximum stress.

In the embodiment described above, five elements 10 are laminated, but this is merely an example, and three or more elements 10 are preferably laminated such that metal surfaces are disposed on the two outer surfaces, as described above.

By increasing the number of laminated elements 10, an adhesion surface area between the fiber reinforced plastic and the metallic material can be increased such that sufficient joining strength is secured even when the length L of the step-shaped joint surface is reduced. As long as a dimension L1 of the 100% metal end portion has a fixed distance that is suitable for the welding and so on described above, as shown in FIG. 4, the length L of the step-shaped joint surface can be reduced, and as a result, a volume occupancy of the fiber reinforced plastic can be increased, leading to a reduction in weight and so on.

Further, since the adhesion surface area between the fiber reinforced plastic and the metallic material is increased, an improvement in electric conductivity between the fiber reinforced plastic and the metallic material is realized.

In a conventional joint structure having a step-shaped joint surface, the step-shaped joint surface is constituted by one or two layers, and therefore, when peeling advances on the single layer step-shaped joint surface due to an impact load and a repetitive load such as a tensile load, compressive load, and bending load, the joint surface may become completely separated or peel away by substantially half such that the structure breaks.

In the joint structure 1, on the other hand, the step-shaped joint surface is constituted by multiple layers, the size of the adhesion surface is increased, and the adhesion surface is formed from dispersed step surfaces disposed parallel to the outer surface from a shallow position to a deep position. Therefore, under equal load conditions, peeling either does not occur or can be limited to a part of the outer surface. Accordingly, the number of laminated elements 10 is preferably increased to three, four, five, and so on.

Carbon fiber reinforced plastic, glass fiber reinforced plastic, and so on may be cited as examples of the applied fiber reinforced plastic, but there are no limitations on the type of fiber reinforced plastic.

Further, a Ti alloy, an Al alloy, an Mg alloy, and so on may be cited as examples of the applied metallic material, but there are no limitations on the type of metallic material. Moreover, as long as a thermosetting resin is used, there are no limitations on the type of applied resin.

What is claimed is:

1. A joint structure for a fiber reinforced resin and a metal, in which end portions of a fiber reinforced plastic and a metallic material are joined via a step-shaped joint surface, wherein a plurality of single elements, each constituted by the metallic material, which includes a step-shaped structure having an end portion that gradually becomes thinner in a direction of an end surface of the end portion so as to form the step-shaped joint surface, and the fiber reinforced plastic, which is laminated such that an end portion thereof covers the step-shaped structure smoothly, are laminated such that the step-shaped structures are superposed in a thickness direction, the metallic material and the fiber reinforced plastic are adhered to each other, and adjacent elements are joined to each other by superposed surfaces thereof, a main welding portion is formed on an outer end of the metallic material by welding mating surfaces of adjacent metallic materials, and a secondary welding portion is formed on the fiber reinforced plastic side of the main welding portion on all of the metallic materials of the plurality of laminated elements by welding all of the metallic materials in the thickness direction.

2. A joining method for a fiber reinforced resin and a metal, by which end portions of a fiber reinforced plastic and a metallic material are joined via a step-shaped joint surface, comprising processes of:

forming a step-shaped structure in which an end portion of the metallic material gradually becomes thinner in a direction of an end surface of the end portion so as to form the step-shaped joint surface;

laminating the fiber reinforced plastic such that an end portion thereof covers the step-shaped structure smoothly;

laminating a plurality of single elements, each constituted by the metallic material and the fiber reinforced plastic laminated to cover the step-shaped structure, such that the step-shaped structures are superposed in a thickness direction;

forming a secondary welding portion at a predetermined interval from outer ends of the plurality of laminated elements on the metallic material side by welding all of the metallic materials of the plurality of elements in the thickness direction;

thermally curing the fiber reinforced plastic such that the metallic material and the fiber reinforced plastic are adhered and adjacent elements are joined to each other by superposed surfaces thereof; and then forming a main welding portion on the outer ends of adjacent metallic materials by welding mating surfaces of the adjacent metallic materials.

* * * * *